(12) United States Patent
Bilbrey et al.

(10) Patent No.: US 9,137,254 B2
(45) Date of Patent: Sep. 15, 2015

(54) LOCAL DEVICE AWARENESS

(71) Applicant: Apple Inc., Cupertino, CA (US)

(72) Inventors: Brett Bilbrey, Sunnyvale, CA (US); Aleksandar Pance, Saratoga, CA (US); Nicholas Vincent King, San Jose, CA (US); Todd Benjamin, Saratoga, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/187,473

(22) Filed: Feb. 24, 2014

(65) Prior Publication Data

US 2014/0173758 A1    Jun. 19, 2014

Related U.S. Application Data

(62) Division of application No. 12/651,430, filed on Dec. 31, 2009, now abandoned.

(51) Int. Cl.
| | |
|---|---|
| *H04L 29/06* | (2006.01) |
| *H04W 8/00* | (2009.01) |
| H04W 8/26 | (2009.01) |
| H04W 12/06 | (2009.01) |
| H04W 12/08 | (2009.01) |
| H04W 48/08 | (2009.01) |
| H04W 48/16 | (2009.01) |

(52) U.S. Cl.
CPC ............. *H04L 63/107* (2013.01); *H04W 8/005* (2013.01); *H04W 8/26* (2013.01); *H04W 12/06* (2013.01); *H04W 12/08* (2013.01); *H04W 48/08* (2013.01); *H04W 48/16* (2013.01)

(58) Field of Classification Search
CPC ........................... H04L 63/107; H04L 63/0492

USPC ........................................................... 726/29
See application file for complete search history.

(56) References Cited

U.S. PATENT DOCUMENTS

| | | | |
|---|---|---|---|
| 4,392,037 | A | 7/1983 | Fleming |
| 5,463,742 | A | 10/1995 | Kobayashi |
| 5,929,405 | A | 7/1999 | Wehrli, III et al. |
| 6,418,534 | B1 | 7/2002 | Fogle |

(Continued)

OTHER PUBLICATIONS

Stettner et al., "Three Dimensional Flash Ladar Focal Planes and Time Dependent Imaging," Advanced Scientific Concepts, Inc., 5 pages, at least as early as Dec. 31, 2009.

(Continued)

*Primary Examiner* — Jason K Gee
(74) *Attorney, Agent, or Firm* — Meyertons, Hood, Kivlin, Kowert & Goetzel, P.C.

(57) ABSTRACT

Certain embodiments may take the form of a method of operating an electronic device to find and determine an identity of other local devices. The method includes transmitting electromagnetic signals from a first electronic device to find devices within a prescribed distance of the first device and receiving electromagnetic response signals from a second electronic device within the prescribed distance from the first electronic device. The method also includes identifying the second electronic device using information received in the electromagnetic response signals. Additionally, the method includes determining if the second electronic device is aware of other electronic devices and, if the second electronic device is aware of other electronic devices, obtaining identifying information of the other devices from the second electronic device.

15 Claims, 9 Drawing Sheets

(56) References Cited

U.S. PATENT DOCUMENTS

| | | | |
|---|---|---|---|
| 6,437,269 | B1 | 8/2002 | Rakus |
| 7,038,665 | B1 | 5/2006 | Pandana |
| 7,209,124 | B2 | 4/2007 | Hunt et al. |
| 7,289,813 | B2 | 10/2007 | Karaoguz |
| 7,316,648 | B2 | 1/2008 | Kelly et al. |
| 7,865,640 | B1 | 1/2011 | Lewis et al. |
| 7,873,764 | B2 | 1/2011 | Bica |
| 2003/0231788 | A1 | 12/2003 | Yukhin et al. |
| 2005/0266835 | A1* | 12/2005 | Agrawal et al. ............ 455/414.3 |
| 2007/0099622 | A1 | 5/2007 | Rappaport et al. |
| 2008/0132243 | A1 | 6/2008 | Spalink et al. |
| 2009/0011707 | A1* | 1/2009 | Ko et al. ....................... 455/41.2 |
| 2009/0046677 | A1* | 2/2009 | Toledano et al. ............ 370/338 |
| 2009/0175561 | A1 | 7/2009 | Lankswert |
| 2009/0183264 | A1* | 7/2009 | Chmaytelli et al. ............ 726/28 |
| 2009/0186575 | A1 | 7/2009 | Cedo Perpinya et al. |
| 2009/0187677 | A1 | 7/2009 | Hunt et al. |
| 2009/0240940 | A1 | 9/2009 | Shoemake et al. |
| 2010/0185785 | A1 | 7/2010 | Wu et al. |
| 2011/0162048 | A1 | 6/2011 | Bilbrey et al. |

OTHER PUBLICATIONS

Author Unknown, "iGPS—Large Scale Metrology," http://www.mikonmetrology.com/ temglate.QhQ?id=47&1ang+&grint=1, 1 page, at least as early as Dec. 31, 2009.

U.S. Appl. No. 12/651,430, filed Dec. 31, 2009, Brett Bilbrey.

* cited by examiner

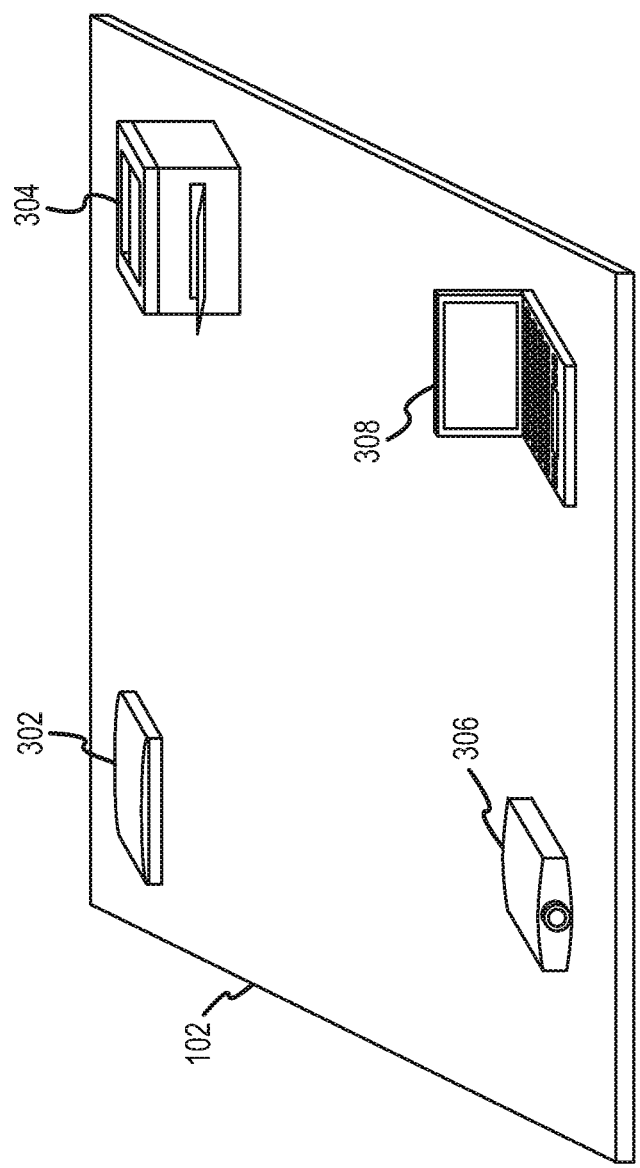

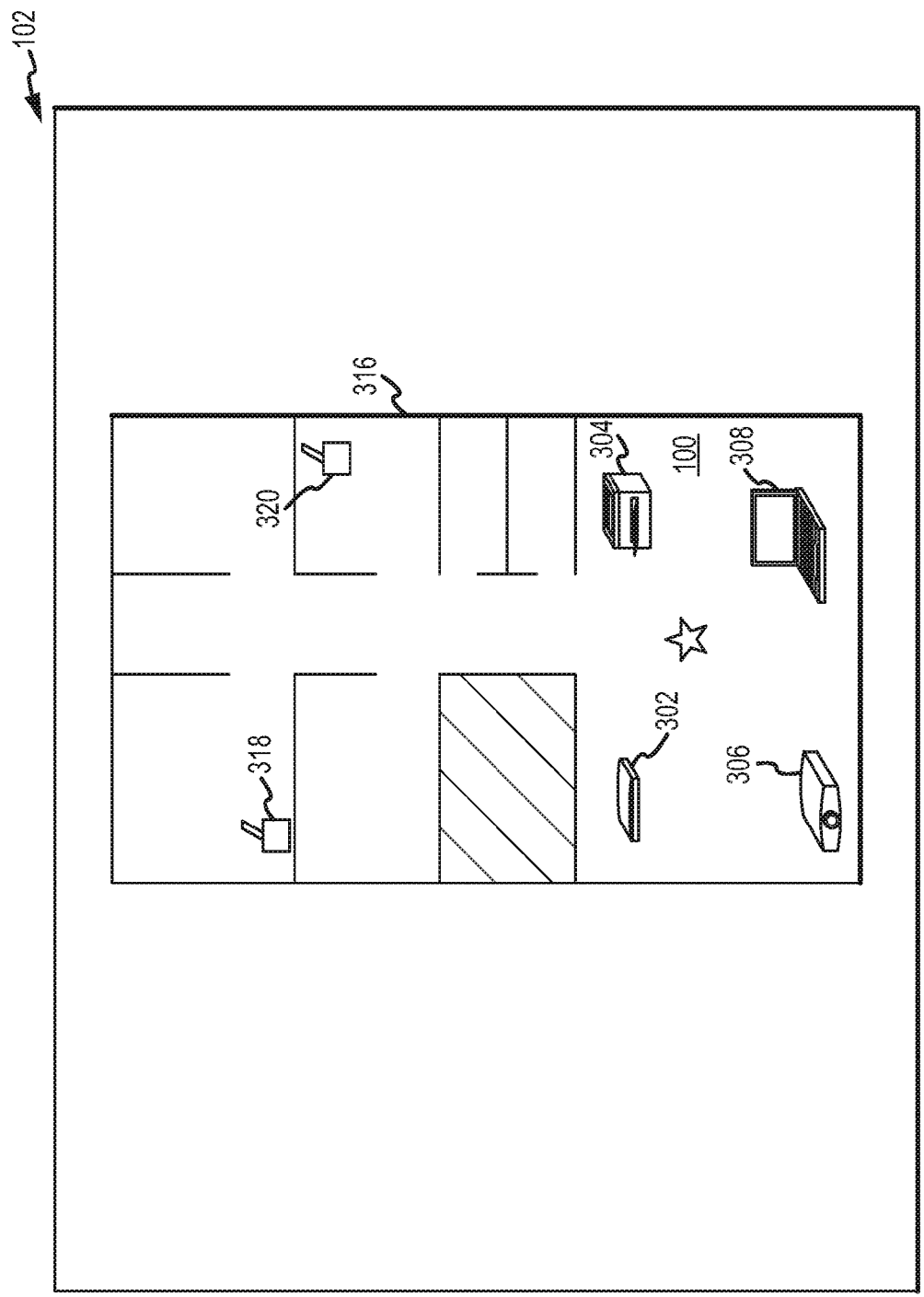

LOCAL DEVICE AWARENESS

CROSS-REFERENCE TO RELATED APPLICATIONS

This application is a divisional of U.S. patent application Ser. No. 12/651,430, entitled "Local Device Awareness," filed Dec. 31, 2009, having inventors Bilbrey et al., which is herein incorporated by reference in its entirety.

TECHNICAL FIELD

Aspects of the present disclosure relate to the operation of electronic devices and, more particularly, to identifying and placing electronic devices located within a particular vicinity.

BACKGROUND

Network-enabled electronic devices commonly communicate instantly over great distances. A network connection allows these devices to be in communicative proximity. That is, the devices communicate generally without reference to any distance between the devices. However, communicative proximity is not necessarily equal to physical proximity. For example, a computer in an office may be able to interact with a number of printers via a network, even if these printers are not physically near the computer. Indeed, the printers may be located on another side of, or on a different floor of, an office building, making use of the printers inconvenient. In some cases, a user of the computer may be aware of a local printer but unable to find the local printer via the network.

SUMMARY

Certain aspects of embodiments disclosed herein by way of example are summarized below. It should be understood that these aspects are presented to provide the reader with a brief summary of certain embodiments disclosed and/or claimed herein and that these aspects are not intended to limit the scope of any claims or disclosure. Indeed, any embodiment disclosed and/or claimed herein may encompass a variety of aspects that may not be set forth below.

Certain embodiments relate to determining spatial proximity of electronic devices. Specifically, some embodiments include a method of operating an electronic device to find and determine an identity of other local devices. The method includes transmitting electromagnetic signals from a first electronic device to find devices within a prescribed distance of the first device and receiving electromagnetic response signals from a second electronic device within the prescribed distance from the first electronic device. The method also includes identifying the second electronic device using information received in the electromagnetic response signals. Additionally, the method includes determining if the second electronic device is aware of other electronic devices and, if the second electronic device is aware of other electronic devices, obtaining identifying information of the other devices from the second electronic device.

Other embodiments include a method of operating a stationary electronic device to facilitate communications between devices within the vicinity of the stationary device. The method includes scanning the vicinity of the stationary device using a first electronic device to determine if other devices are present and determining that more than one other device is present in the vicinity. An identity of each of the more than one other device present in the vicinity is determined and each of the more than one other device is provided with the identifying information of the more than one other devices.

Still other embodiments include an electronic security device. The electronic security device includes a processor and a memory coupled to the processor storing operating instructions for the electronic security device. Additionally, the electronic security device includes one or more vicinity sensors configured to determine when other electronic devices are in a vicinity of the electronic security device. When other electronic devices are determined to be within the vicinity of the electronic security device, the electronic security device determines an identity of the other devices and grants access to a document to the other devices while the other devices are determined to be within the vicinity of the electronic security device.

These and other advantages, aspects and features of the present disclosure will become apparent to those of ordinary skill in the art upon reading this disclosure in its entirety.

BRIEF DESCRIPTION OF THE DRAWINGS

FIGS. 3A-3C illustrate a display of the electronic device of FIG. 2, graphically indicating locations of nearby devices.

DETAILED DESCRIPTION

General Overview

Figure 1:
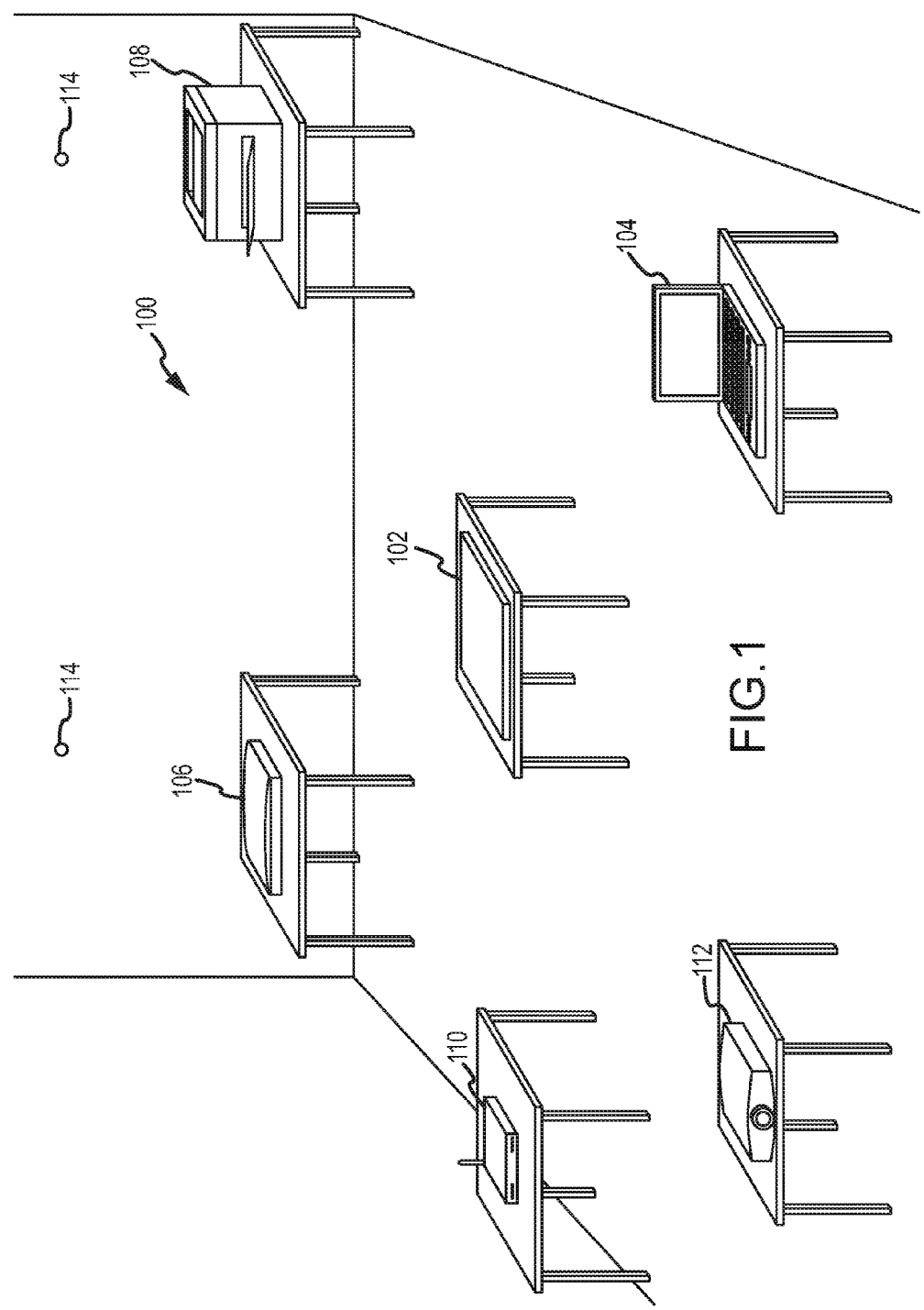
FIG. 1 illustrates a room with multiple electronic devices.

Certain embodiments may take the form of an electronic device capable of local device awareness. That is, the electronic device is configured to determine the identity and/or location of apparatuses located within its vicinity. One or more technologies may be used to determine if apparatuses are in the vicinity. For example, one or more of an indoor GPS, a Bluetooth® antenna, a radio frequency identification (RFID) device, an ultrasonic device, an infrared device, and so forth, may be used to determine if apparatuses are in the vicinity. In some embodiments, the same technology used to find devices in the vicinity of the electronic device may be used to determine the identification of the device. For example, RFID may be used to determine the presence of a particular device and the device's identifying information. In other embodiments, a first technology may be used to determine if apparatuses are in the vicinity of the electronic device and a second technology may be used to obtain identifying information.

In some embodiments, upon finding apparatuses within its vicinity, the electronic device may query the apparatuses as to whether they are aware of still additional devices within the vicinity. If they are aware of additional devices, these additional devices' relative location and/or identities may be provided to the electronic device. Thus, information may be passed in a daisy chain manner to increase the knowledge of the electronic device.

When apparatuses are found in the vicinity, the electronic device may display icons corresponding thereto on a display. In some embodiments, the icons are arranged on the display to imitate the relative location of the apparatuses to the electronic device. Additionally, in some embodiments, the electronic device may be assumed to be in the center of the display and the icons may be positioned about the center of the display according to their direction relative to the electronic device. In other embodiments, an icon representative of the electronic device may be shown on the display. Additionally, in some embodiments, the icons may be overlaid on a floor plan, thus showing the locations of the devices relative to the floor plan.

A communication channel may be opened between the electronic device and any or all of the apparatuses found in its vicinity. In some embodiments, the communication channel may be a peer-to-peer communication channel. Additionally, the communication channel may be implemented by the same or a different technology than that used to find the other device. In other embodiments, the communication channel may be via a network connection, such as a wireless network connection. The communication channel may be used to transfer data, files, and/or other information.

The transfer of data may be initiated by selecting icons displayed on a display of the electronic device. For example, an icon representing a document stored on the electronic device may be selected and moved to an icon representing one of the apparatuses. In some embodiments, the selection and movement of the icon may be via a mouse, for example. In other embodiments, a touch screen may be implemented and a user's gestures may be interpreted to initiate a file transfer. For example, a user may select an icon representing a file stored on the electronic device by touching the display and move the selected icon toward an icon representing one of the other device to initiate the file transfer.

Definitions

As used herein, the term "vicinity" refers to a local area relative to an electronic device. In some instances, the local area may be determined based on a particular technology used to establish a vicinity. In other instances, the local area may be based on physical properties, such as walls defining a room or a building.

As used herein, "presence" may refer to the physical presence of an object. In one example, an object may be physically present within a particular vicinity of another device.

As used herein, "identification (ID)" may refer to identifying information of a device such as a media access control (MAC address), a unique alphanumeric identifier, a physical address, identifying functions of the device, and so forth.

As used herein, "vicinity scan" may refer to operating one or more vicinity sensors to determine if devices are located within a prescribed area. Additionally, the vicinity scan may determine the relative location of devices and their distance from the source of the vicinity scan.

As used herein, the terms "device" and "apparatus" may be used interchangeably.

Embodiments

FIG. 1 illustrates an example room 100 having electronic and computing devices present within the room 100. In particular, the room 100 includes a tablet computer 102, a computing device 104, a scanner 106, a printer 108, a WiFi access point 110, and a projector 112. Additionally, one or more local references 114 may be provided. In some embodiments, the local references 114 may be implemented as part of an indoor global positioning scheme. Each of the devices may be configured to communicate via one or more wired and/or wireless communication protocols. For example, the printer 108 may be configured to receive files for printing via a wireless network protocol, such as IEEE 802.11n, and/or via a wired network protocol, such as Ethernet. As such, the devices may be network accessible and may communicate via a network connection.

Additionally, one or more of the various devices may be configured to determine a relative position and identification (ID) of other apparatuses within the room. In some embodiments, the tablet computer 102 may be configured to determine the presence and/or ID of other devices within a certain radius of the tablet computer 102. In one embodiment, the radius may be defined based on the technology used to find the other devices. In other embodiments, the radius may be defined based on physical properties of the environment, such as walls.

Moreover, in some embodiments, the tablet computer 102 may be configured to determine the relative position or location of other devices within its vicinity. For example, the tablet computer 102 may determine the relative position of the scanner 106, the printer 108, and the projector 112.

Additionally, the tablet computer 102 may display icons representative of the other devices in a representative manner on its display. In some embodiments, the icons may be displayed in a location indicative of the other devices' relative position to the tablet computer 102, assuming the tablet computer 102 is located at the center of the display. For example, referring to FIG. 1, an icon for the printer 108 may be located in an upper right corner of a display for the tablet computer 102.

Figure 2:
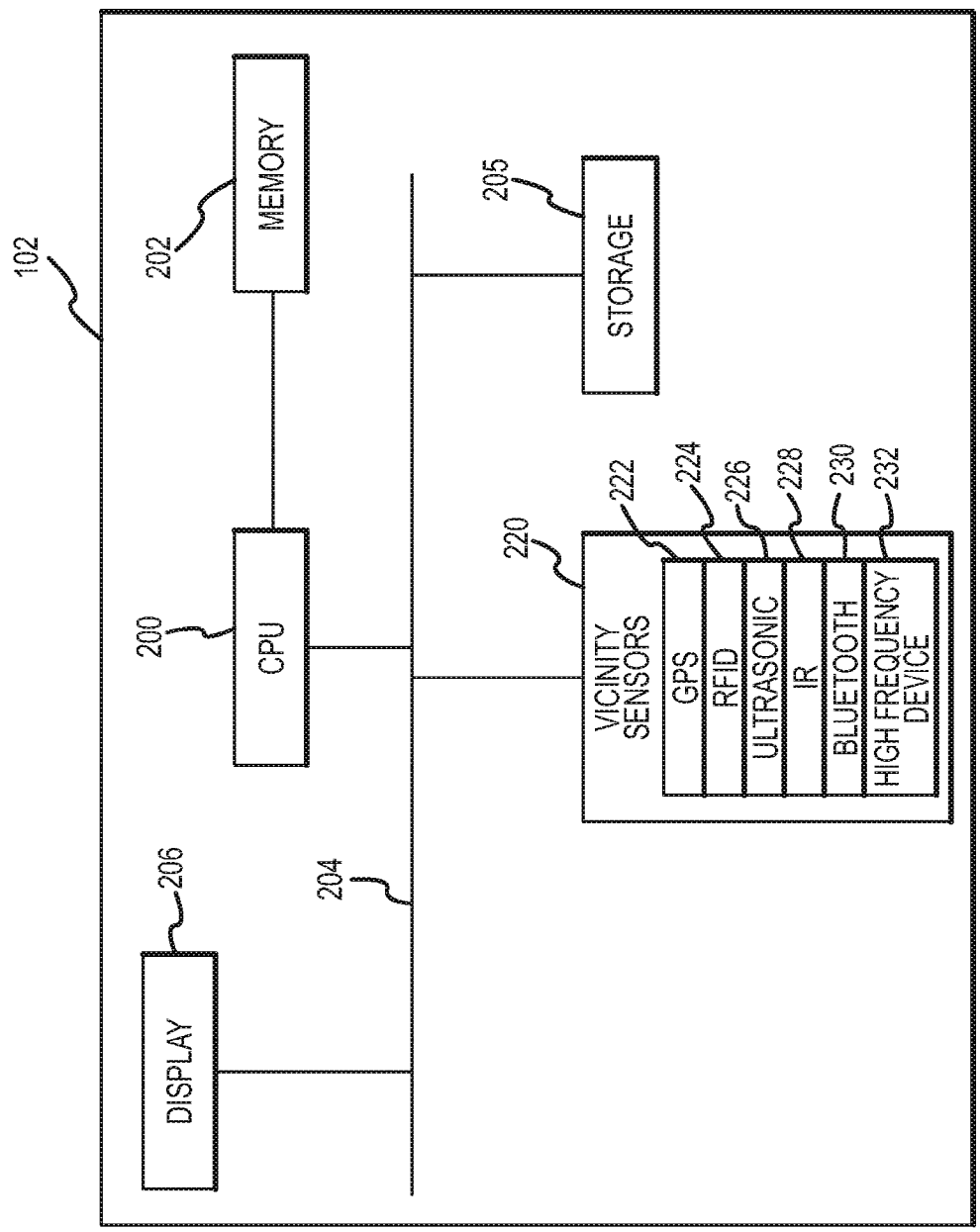
FIG. 2 is an example block diagram of an electronic device configured to provide local device awareness.

FIG. 2 is an example block diagram of the tablet computer 102 of FIG. 1. The tablet computer 102 includes a processor 200, which may be any suitable processor, and in some embodiments includes more than one processor and/or a multi-core processor. The processor 200 is coupled either directly or indirectly to various other component parts of the tablet computer 102. In particular, the processor 200 may be coupled to a memory 202 which may take the form of random access memory (RAM), dynamic RAM, static, RAM, Flash, read-only memory (ROM), solid state memory, or the like.

A bus 204 may be used to couple one or more components to the processor 200. For example, a data storage device 205 and a display 206 may be coupled to the processor 200 via the bus 206. The data storage device 205 may implement one or more storage technologies, including: hard disk drives; solid state disk drives; and other similar technologies configured for non-volatile storage of data.

The display 206 may be implemented using any suitable display technology such as a liquid crystal display (LCD), organic LCD, light emitting diode (LED), or the like. The tablet computer 102 may provide visual output via the display 206. In some embodiments, the display 206 may be configured to receive input as well as provide output. For example, the display 206 may be configured as a touch-screen.

Determination of Other Devices Within Vicinity

Additionally, the tablet computer 102 includes one or more I/O devices that function as vicinity sensors 220 may be provided. The vicinity sensors 220 may be used to determine the presence of other electronic devices within the vicinity of the tablet computer 102 and, in some embodiments, the position and ID of other devices. One or more the following may be included and used for such purposes: a global positioning system (GPS) device 222; a radio frequency ID (RFID) device 224; an ultrasonic device 226; an infrared device 228; a Bluetooth device 230; a high frequency device 232, such as a 60 GHz band device; and so on.

In one embodiment the GPS device 222 may facilitate determining if other devices are in the vicinity of the tablet computer 102. Generally, because the GPS device 222 relies on satellite communication, it may not be reliable indoors, such as in an office environment, a home, and the like. In some embodiments, the GPS device 222 may operate as an indoor GPS device. In these embodiments, the indoor GPS device 222 operates in conjunction with the one or more local references 114 (e.g., laser transmitters) to determine the location of the other devices in the vicinity of the tablet computer 102. In some embodiments, the GPS device 222 may include software and/or hardware for processing the location information. In some embodiments, the GPS device 222 may communicate with the one or more local references 114 to obtain location information. For example, the GPS device 222 may wirelessly communicate with a receiver hub to receive location information.

Additionally, in some embodiments, one or more other vicinity sensors 220 may be implemented in conjunction with the GPS device 222 to achieve a desired level of vicinity sensing. In one embodiment, the one or more other vicinity sensors 220 may be suited to determining if other devices are within line-of-sight of the tablet computer 102. For example, the infrared device 228 may be used in conjunction with the GPS device 222 for such purposes. Additionally, the infrared device 228 may be used to determine the distance of objects and may be used for communication of identity information.

In another embodiment, the RFID device 224 may be used to determine if other devices are located within the vicinity of the tablet computer 102. The RFID device 224 may be implemented as an active, passive, or semi- passive device. In one embodiment, the RFID device 224 may be implemented as an active device that transmits radio frequency (RF) signals that may be detected by RF antennas. In another embodiment, the RFID device 224 may include a passive device that includes an antenna configured to generate an electromagnetic field in response to receiving a particular frequency signal. The electromagnetic field powers the device to transmit an RF signal in return. In some embodiments, the return signal may include identification information. In yet another embodiment, both active and passive components may be provided. For example, in one embodiment, a passive RFID device may be used to actuate an active RFID device or other device. In particular, the passive RFID device may be coupled with an integrated circuit that is activated by the passive RFID device and which functions to actuate other vicinity sensors. As such, the passive RFID device may be used to initiate vicinity scans.

The ultrasonic device 226 and the high frequency device 230 may be used for determining if other devices are located within an area and for imaging the area. Specifically, the high frequency device 226 may include a steerable field array that may be configured to scan an area, such as the room 100, and determine contours of physical objects within the room. For example, a 60 GHz band device may transmit probe signals that are reflected back and used to determine the location, distance and shapes of objects within the room. The shapes may be used to distinguish between electronic devices and other objects within the room. In particular, the shapes may be compared with common shapes of electronic devices to determine if a particular object may be identified as an electronic device.

In some embodiments, the high frequency device 230 may be configured to obtain 3-D images. Specifically, the high frequency device may be implemented as part of a ladar system. It should be appreciated that the high frequency device 230 may be external to the tablet computing device 102 and communicatively coupled thereto. The tablet computing device 102 may include software for the processing of images obtained by the high frequency device 230 and the images may be used to determine the location of objects including electronic device within the vicinity. In some embodiments, the high frequency device 230 may be implemented as a 3-D flash ladar described in Stettner, Rodger; Howard Bailey, and Steven Silverman; "*Three Dimensional Flash Ladar Focal Planes and time Dependent Imaging*," Advanced Scientific Concepts, Inc., 305 E. Haley St, Santa Barbara, Calif. 93103, which is incorporated herein by reference in its entirety and for all purposes.

A Bluetooth® device 230 (or other RF device) may also be used to find and identify the devices. In some embodiments, the Bluetooth® device 230 may operate at low power settings or, in other embodiments, it may operate at higher power level to increase its effective range. Additionally, the Bluetooth® device 230 may be implemented to communicate data in accordance with the Bluetooth® protocol. Moreover, it should be appreciated that other RF devices may be implemented to find and identify the devices. The RF devices may operate in one or more frequency bands commonly used for short range communication.

It should be appreciated that one or more of the vicinity sensors 220 may operate to determine if there are other devices in the vicinity of the tablet computer 102. Additionally, it should be appreciated that one or more vicinity sensors 220 may be used for determining the ID of the other devices. Moreover, it should be appreciated that other suitable techniques may also or alternatively be employed to determine if other devices are in the vicinity of the tablet computer 102 and the ID of the other devices.

Locating and Mapping Other Devices

In some embodiments, the location of other devices relative to the tablet computer 102 is determined. This may be accomplished in a variety of ways. For example, in one embodiment, the indoor GPS device 222 may be used to determine the location of the tablet computer 102 and one or more of the other devices, and then determine their relative positions. In another embodiment, the high frequency device 226 may be used to obtain an image of the room 100 which may be analyzed to determine the relative location of the other devices. Other ways of determining the location of other device may include using signal strength of WiFi, Bluetooth®, or other network signals that are transmitted from other devices and detected by the tablet computer 102. In some embodiments, the signal strength may be used to triangulate the location of devices. Specifically, the relative strength of received signals from other devices may be indicative of the proximity of the other devices to the tablet computer 102. The other devices may be configured to determine the relative strength of signals they receive and then share the signal strength information with the tablet computer 102. The aggregated signal strength information may be processed to determine the relative position of other devices. In other embodiments, ultrasonic and/or infrared triangulation or scanning may be implemented to determine the relative positions of other devices.

In yet another embodiment, multiple antennas within the tablet computer 102 may be implemented to determine an origin of wireless communications from the found devices. The multiple antennas may be distributed throughout the device so that received signals are time shifted. Additionally, the distribution of antennas may provide for a difference in signal strength between the signals received. For example, an antenna located on an opposite side of the tablet computer 102 from one of the other devices may receive a weaker signal and/or a delayed signal relative to the signal received by an antenna located on the same side of the tablet computer 102 as the other device. In one example, an IR transmitter and distributed receivers may be implemented. The distributed receivers may be located at different sides of the tablet computer 102 and configured so that they receive signals generally originating from their side of the computer and not from the other side. As such, the tablet computer 102 may determine a general location of a source of IR transmissions.

Once the locations of the devices in the vicinity are determined, icons representative of the devices may be displayed indicative of the relative position to the table computer 102. FIG. 3A illustrates the tablet computer 102 with icons 302, 304, 306 and 308 displayed. As illustrated, the location of the icons 302, 304, 306 and 308 on the display 208 correspond to the relative location of the other devices to the tablet computer 102. Additionally, the icons 302, 304, 306 and 308 may be stylized representations of the devices to which they correspond. As such, the printer icon 304 looks like a printer, the projector icon 308 looks like a projector, and so forth. In some embodiments, if other computers are identified as owned by specific users, then an image of the user can be displayed rather than an icon. Additionally, relevant user information may be displayed. The relevant user information may be obtained from an address book stored on the tablet computing device 102. In other embodiments, the user information may be provided wirelessly from the other device. In yet other embodiments, the user information may be provided from a network storage location.

A user may interact with the found other devices by dragging and dropping documents on the icons 302, 304, 306 and 308 and/or through gesturally directing documents or other data toward the icons. For example, a user may select an item using the touch screen and move it toward an icon 306 representing the projector 112. In the case of a document, the document may then be sent to the projector 112 for display by the projector. In other embodiments, a user may select an the item using a mouse and move it to the projector 112. In some embodiments, the location of the other devices relative to the tablet computing device 102 may be displayed and updated on the desktop continually, i.e., as the other devices move.

It should be appreciated that although a document has been used as an example, other data may be communicated between the devices and other services/resources may be provided and/or accessed in a similar manner. For example, printing services on locally connected printers, network access services, video services (i.e., sharing a camera), video projection services (i.e., projector), audio services (i.e., using a microphone on one device by another device), and so forth may be indicated by an icon and accessed by selecting the icon or providing the data to the icon. Security consideration would apply to each circumstance as appropriate. For example, the use of audio services may be limited to those in a particular vicinity, thus limiting the use of the audio services to those who may be involved in a particular conversation.

In some embodiments, a floor plan of a building in which the tablet computer 102 is located may be provided. For example, the floor plan may be stored by the tablet computer 102 or made available to it via the wireless network. Additionally, a compass within the tablet computer 102 may provide an orientation for the tablet computer 102. The orientation may be used to map the devices relative to the floor plan 316, as shown in FIG. 3B. As shown, other devices 318 and 320 may be displayed also, although they are not in the same room 100 as the tablet computer 102.

Figure 3C:
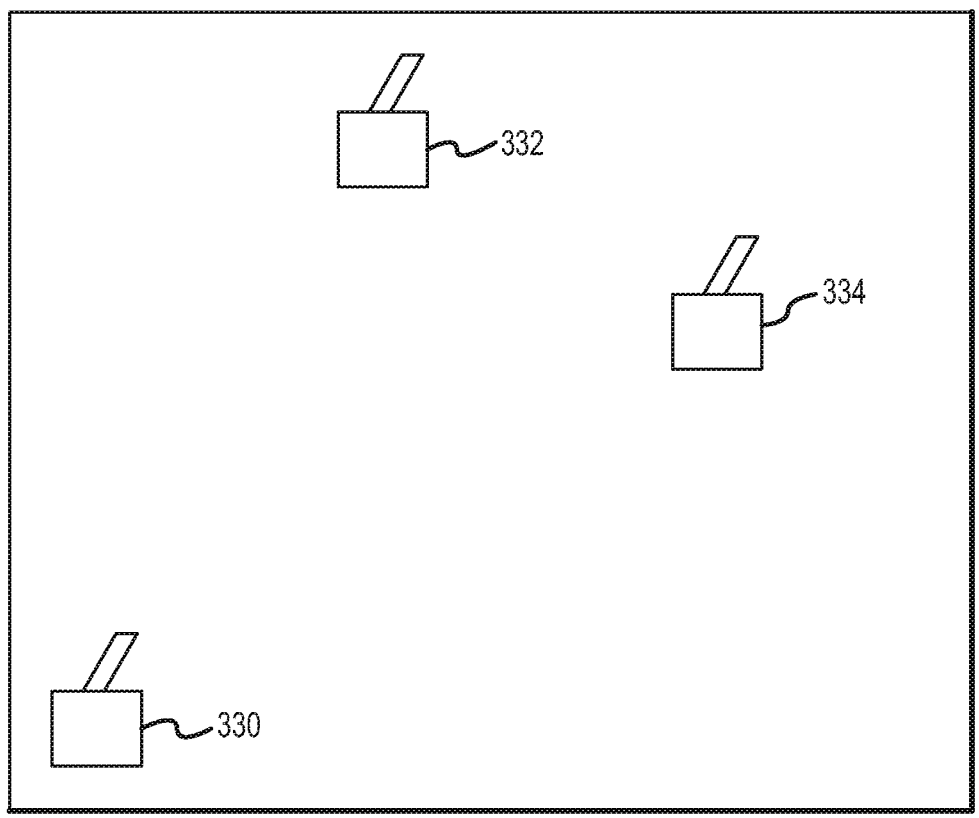

Additionally, in some embodiments, if more than one of the same type of device is found within the vicinity of the tablet computer 102 (e.g., if three printers are found), a printer located closest to the tablet computer 102 may be set as the default printer. FIG. 3C illustrates an example where three printers 330, 332 and 334 are all located within the vicinity of the tablet computer 102. In this example, the closest printer 304 is set as the default printer. In some embodiments, printers other than the closest printer are not displayed.

In some embodiments, the tablet computer 102 may obtain location information and mapping information for the devices and/or the floor plan from other devices. Specifically, one or more other devices may be configured to store such information and provide it to the tablet computer 102 when the table computer 102 enters the vicinity of the other devices.

Finding and Interfacing Other Devices

Figure 4:
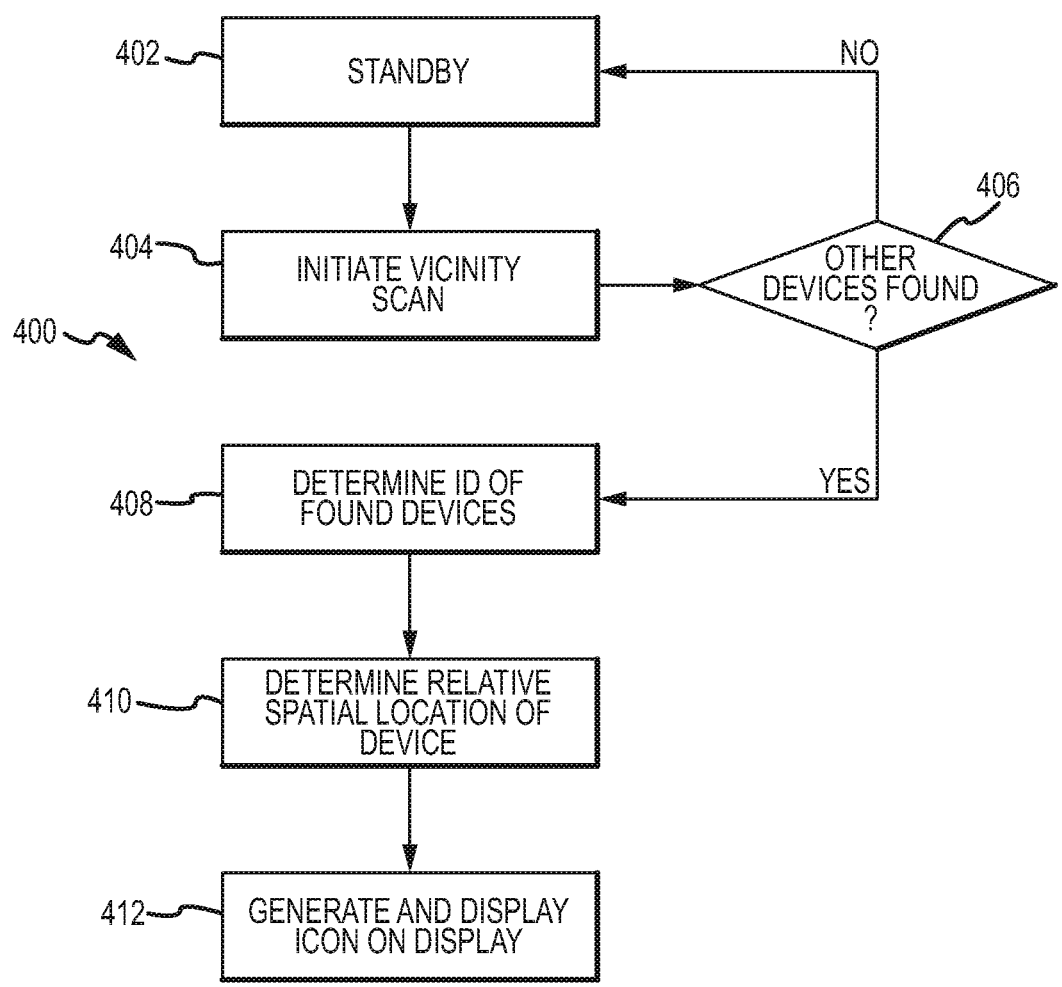
FIG. 4 is a flowchart illustrating a method for determining if enabled devices are in a vicinity of a first device.

FIG. 4 is a flowchart 300 illustrating vicinity detection of electronic devices in accordance with an example embodiment. For the purposes of this discussion, the tablet computer 102 is provided as an example device performing the steps indicated in the flowchart to determine if other devices are in its vicinity. It should be appreciated, however, that the steps may be performed by other devices.

Initially, the tablet computer 102 may be in a standby mode (Block 402). A vicinity scan is initiated (Block 404) to determine if other devices are in the vicinity of the tablet computer 102. In one embodiment, the vicinity scan may occur periodically, such as every minute, every other minute or every five minutes, for example. In other embodiments, the vicinity scan may be initiated upon receiving user input. For example, in one embodiment, the user may tap a touch screen or tap the mouse. In yet other embodiments, a passive RFID antenna may be actuated when another device in the vicinity emits RF signals.

If no other devices are found, the tablet computer 102 may return to a standby state (Block 402). Alternatively, if other devices are found, the tablet computer 102 may determine an identification (ID) of the found other devices (Block 408). In some embodiments, the ID may include a media access control (MAC) address, an Internet protocol (IP) address and/or another identifier that may be used for communication purposes. In some embodiments, the ID may be used for peer-to-peer communications. In other embodiments, the ID may be used for network communications. Additionally or alternatively, in some embodiments, the ID may describe functions that the found device is capable of performing so that a user may know what resources are available.

In some embodiments, the tablet computer 102 also determines a relative position of the other devices (Block 410). The tablet computer 102 then generates icons corresponding to each of the found other devices and displays the icons on the display (Block 412). If the relative spatial location of the found devices is known, corresponding icons may be positioned on the display in a location indicative of the relative spatial location of the found other devices to the tablet computer 102.

Moreover, in some embodiments, one or more accelerometers may be implemented to determine movement of the tablet computer 102. As the movement of the tablet computer 102 may effect the relative position of the other devices with respect to the tablet computer 102, the compass and accelerometers may be used to adjust the displayed icons appropriately to reflect any changes in relative position.

Figure 5:
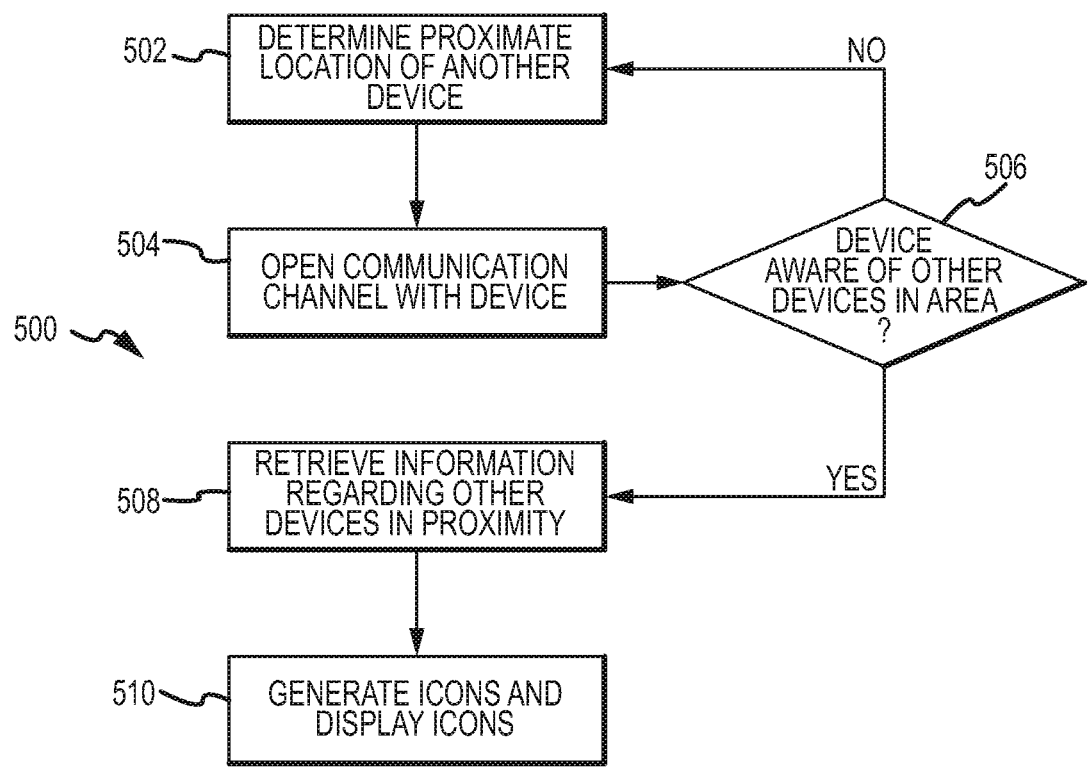
FIG. 5 is a flowchart illustrating local device awareness sharing between devices located in a common vicinity.

FIG. 5 is a flowchart illustrating an alternative or additional method 500 for determining if devices are in the vicinity of the tablet computer 102. Generally, the method 500 begins by determining at least one other device is in the vicinity (Block 502) by way of one or more of the aforementioned techniques.

Once one or more other devices are found to be in the vicinity, a communication channel is opened with each of the other devices (Block 504). In one embodiment, the communication channel between the devices may be via a local area network. In other embodiments, the communication channel may be via a peer-to-peer protocol. Additionally, the communication channel may be accomplished via the same mode that was used to discover the other device. For example, in some embodiments, one or more other devices may be discovered via a wireless protocol, such as Bluetooth®, and the same wireless protocol may be used for the communication channel between the two devices.

Using the opened communication channel, the tablet computer 102 determines whether the other devices are aware of additional other devices in the vicinity (Block 506). If the other devices are not aware of additional other devices in the vicinity, the tablet computer 102 may perform another scan for other devices. Additionally, if the tablet computer 102 is aware of other devices in the vicinity, the tablet computer 102 may provide the information to the other devices so that they may be aware of additional other devices also.

If the found other devices are aware of additional other devices in the vicinity, the tablet computer 102 may retrieve the information about the other devices in the vicinity from the found other devices (Block 508). Accordingly, the tablet computer 102 may be made aware of other devices and resources in the vicinity without having to perform multiple scans. Furthermore, in some cases, obstacles, such as desks, partitions, and/or other devices, for example, may make it difficult for the tablet computer 102 to scan for all devices within a prescribed vicinity, depending on the technology used to discover the over devices.

Once the information related to other devices in the vicinity is shared, the tablet computer 102 may generate and display icons representative of the various devices present in the vicinity of the tablet computer 102 (Block 510). As before, the user may interact with the various devices in the vicinity by selecting the icon associated with a particular device and/or by dragging and dropping documents, files, and the like on the icon.

In some embodiments, a single device may be used for the determination of other devices present in a particular area. The single device may be stationary and may be located at a known position within the area. For example, in FIG. 1, the WiFi access point 110 or the printer 108 may be used as the single device for determination of devices present within the area.

Figure 6:
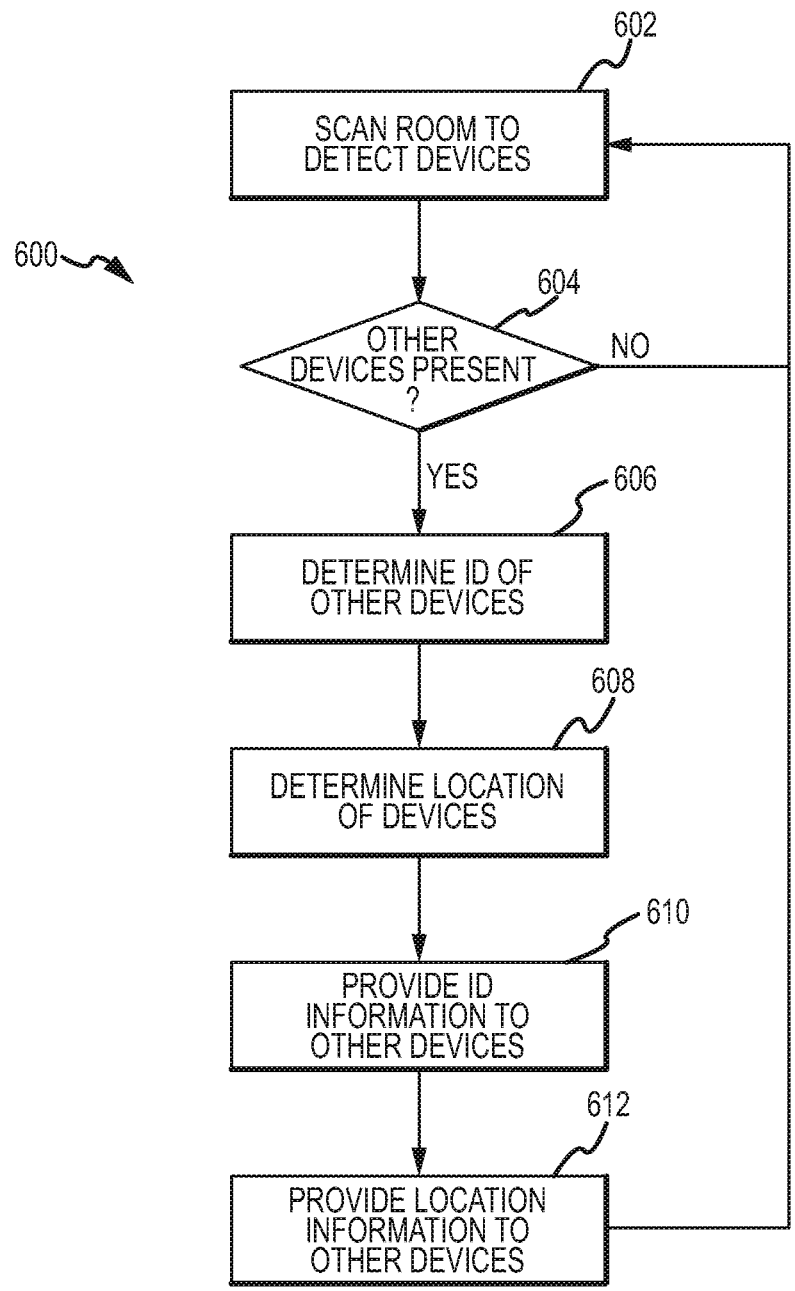
FIG. 6 is a flowchart illustrating a method of using determine device location and identification and providing the location and identification information to the devices in the vicinity.

FIG. 6 illustrates a method 600 of using a single device, such as the WiFi access point 110, to determine if devices are in the vicinity of the single device. The WiFi access point 110 may be configured to continuously, randomly, or periodically monitor the contents of the room 100. The method 600 begins with the WiFi access point 110 scanning the room 100 (Block 602). One or more of the above mentioned vicinity sensors 220 may be implemented for the purposes of scanning the room 100. In one embodiment, the WiFi access point 110 may include a high frequency device, such as a 60 GHz band device, with a tunable antenna for scanning the room. The tunable antenna allows the device to capture an image of the area surrounding the device. In another embodiment, an IR emitter may be deployed with reflective sensors to determine the presence of objects.

The determination of the contents of the room may occur in a variety of different ways using the data collected from the 60 GHz scan. For example, in one embodiment, the WiFi access point 110 may be configured to determine the shape of various objects and compare them with template shapes. From the comparison, the WiFi access point 110 may be able to determine a function and/or identity of the other devices in the vicinity. In other embodiments, other vicinity sensors may be used in conjunction with the 60 GHz band device. For example, an RFID device may be used to determine the presence of devices in the vicinity. Thus, from the scan, it is determined whether other devices are in the vicinity (Block 604).

If no other devices are found in the vicinity, the WiFi access point 110 may perform another scan (Block 602). Subsequent scans may be initiated based on a threshold amount of time lapsing or on receiving user input to perform a scan, for example. In yet other embodiments, the WiFi access point 110 may be configured to determine when other devices are attempting to use it for wireless communications and perform a scan.

If other devices are in the vicinity, the ID of the other devices is determined (Block 606). In some embodiments, one or more other technologies may be used in combination with the 60 GHz device to identify the devices in the vicinity. The location of the other devices may also be determined (Block 608). The data collected using 60 GHz band device may be used to map the location of the devices relative to the WiFi access point 110.

The ID information for the other devices within the vicinity is then provided to all the other devices detected in the vicinity (Block 610). The ID information may be provided via any suitable method including via WiFi, Bluetooth®, RFID, infrared, or other methods. The location information for the found devices is also provided to the other devices (Block 612). The location information allows each of the other devices to generate maps of the devices in the vicinity so that they have local device awareness.

In some embodiments, the method 600 is repeated periodically or upon receiving a signal , such as an RFID signal, indicating that a new device has entered the vicinity. Upon discovering a new device in the vicinity, the data regarding the other devices is updated and may be provided to the other devices.

The local device awareness may be implemented in various different devices and for various different purposes. For example, local device awareness may be useful in collaborative environments. In one embodiment, the local device awareness may be used as a security measure. Specifically, access to a particular collaborative project may only be gained by being present.

Figure 7:
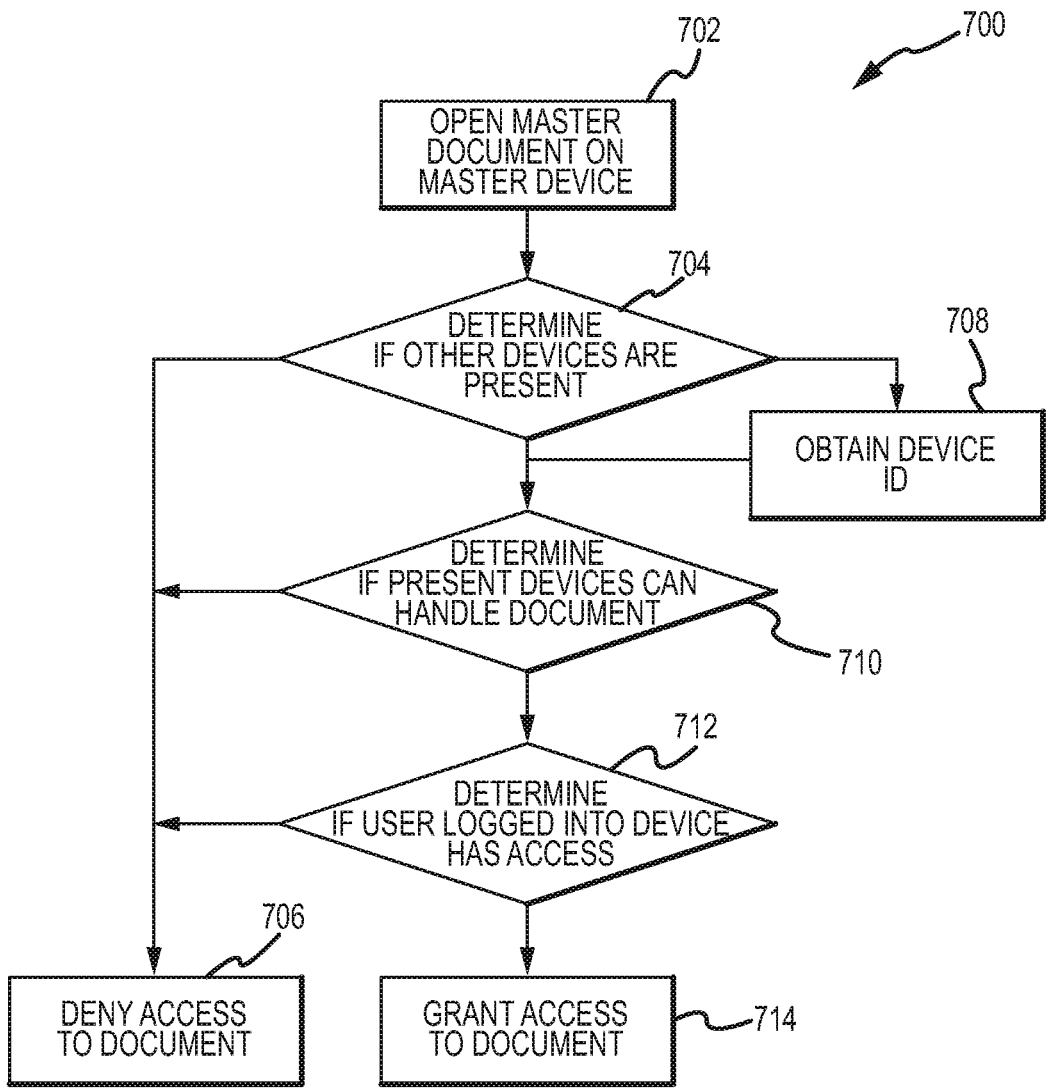
FIG. 7 is a flowchart illustrating an example method of using local device awareness for security purposes.

FIG. 7 is a flowchart illustrating an example method 700 of using local device awareness as a security measure. Initially, a master document stored on a master device may be opened (Block 702). The master document and master device may be controlled by a supervisor, a manager or a project leader for a collaborative project. Thus, the master device may be any suitable device. In some embodiments, the master device may be a notebook or tablet computing device, such as the tablet 102. In other embodiments, the master device may be a smartphone capable of viewing and editing documents. Additionally, it should be appreciated that although the present example describes a "master document," other collaborative items may be similarly treated. That is a data set, a drafted web page, or something that is not explicitly a document. Accordingly, the term "document" as used in this context may refer to any collaborative set of information, data, documents, files, arrangement of data, and so forth.

The master document may be stored on the master device in some embodiments. In other embodiments, the master document may be stored in a network location separate from the master device. For example, the master device may be a stationary device, such as printer 108 or access point 112, located in a particular room or area. The master device functions to determine what devices are located within it vicinity and communicates the information regarding the devices to the network storage device to allow access. In another embodiment, the master device may provide authentication credentials to the devices found in the vicinity so that they may use the credentials and access the master document.

In some embodiments, the opening of the master document opens the document to a collaborative environment in which other devices may view, edit and save copies of the document. Alternatively, in other embodiments, the document may not be opened but rather is accessed by other devices from the master device without the document being opened. Thus, the document may be available to other devices without being opened.

The master device determines if other devices are in the vicinity (Block 704). The master device may implement one or more of the aforementioned techniques to determine if other devices are in the vicinity. If no devices are found in the vicinity, then access to the master document is denied. If devices are found in the vicinity, the master device obtains the identification of the devices in the vicinity (Block 708) and determines if the devices can displaying, editing, and/or store the document (Block 710). For example, in some embodiments, a coffee maker or a radio may be found in the vicinity of the master device, but unable to display, edit or store a copy of the document. Such devices are denied access to the document (Block 706).

For devices that are capable of displaying, editing, and/or storing the document, it is determined whether the user of the device should have access to the document (Block 712). In some embodiments, the determination of whether a user should have access may be determined based on the information obtained during identification of the device. Specifically, additional information such as a username for a currently logged in user may be obtained. In other embodiments, a user of the device may be requested to provide authentication information. For example, a username, password and/or project or document name may be required for access.

Upon determination that the user of the device is permitted to access the document, access to the document is granted (Block 714). Further, as the master device may include documents and information other than the master document, in some embodiments, access to other documents is denied without additional authentication. Additionally, the master device may be configured to perform vicinity scans periodically and when a device is found to have left the vicinity, continued access to the document is denied.

In some embodiments, the master document may be sent out to more than one device in the vicinity of the master device. For example, in a school environment, an instructor may have a master document, such as an examination document, to be distributed to the students within a classroom. When the instructor has indicated to send the device to the students (e.g., by moving an icon of the master document to an icon representing student computers, the master document is sent to their computers. Similarly, students may submit their completed exams or other work to the instructor by selecting and moving an icon representing the master document (edited by the student) toward and icon representing the instructor's device. Thus, the distribution and collection of documents may be facilitated. In other embodiments, the document may be made available to all devices within the classroom at a certain time and/or for a certain period of time. Upon expiration of the time period, all documents are returned to the master device.

In some embodiments, a document may be accessible to other devices within a vicinity of a master device for collaborative editing of the document in a collaborative environment. For example, in one embodiment, a document may be accessed and edited by users of other devices and edits to the document made by the users may be reflected in the master document. In one embodiment, the edits may be entered into the master document as color coded edits based on who made the changes. In some embodiments, the changes may be approved or declined by a user of the master device or a user who has master privileges to change the master document. If a device accessing the master document in the collaborative environment leaves the vicinity of the master device, further access to the master document may be denied. Additionally, if a master device leaves the vicinity of the other devices, access to the master document by the other devices may be denied and/or cease. That is, the master document may not be accessible for further editing and/or may not be displayed on the other devices.

In yet another embodiment, the local device awareness may be used in a gaming environment. For example, as the electronic tablet computer 102 of FIG. 1 may be used as a centerpiece of a game and the display of the tablet computer 102 may be used as a game board. Other devices located in the vicinity of the tablet computer 102 may be used to interact with the tablet computer 102 as a centerpiece. For example, users may shake other devices having accelerometers to roll dice in the game. Alternatively, physical dice with RFID may be rolled and communicate results the tablet computer 102 when rolled.

Although the present disclosure has been described with respect to particular systems and methods, it should be recognized upon reading this disclosure that certain changes or modifications to the embodiments and/or their operations, as described herein, may be made without departing from the spirit or scope of the invention. Indeed, one or more of the techniques described herein may be implemented in whole or in part and may be combined with one or more of the other techniques disclosed herein. For example, one or more steps of the method shown in FIG. 7 may be implemented independent from the other steps and/or in conjunction with one or more steps from the methods shown in FIG. 5 or 6. Accordingly, the proper scope of the disclosure is defined by the appended claims and the various embodiments, operations, components, methods and configurations disclosed herein are exemplary rather than limiting in scope.

The invention claimed is:

1. An electronic security device comprising:
   a processor;
   a memory coupled to the processor, the memory storing operating instructions for the electronic security device; and
   one or more vicinity sensors, the vicinity sensor being configured to determine when other electronic devices are in a vicinity of the electronic security device;
   wherein when other electronic devices are determined to be within the vicinity of the electronic security device, the electronic security device:
   determines an identity of the other devices; and
   grants access to a document to the other devices while the other devices are determined to be within the vicinity of the electronic security device, wherein the document is stored on a master device that is remote from the electronic security device, wherein the granting access to the document comprises providing authentication credentials to one or more of the other devices, wherein the master device provides access to the document in response to receiving the authentication credentials from the one or more other devices;

wherein the electronic security device is configured to determine when one of the other devices leaves the vicinity and to deny access to the document to the one of the other devices when the one of the other devices leaves the vicinity.

2. The electronic security device of claim 1 further configured to:
determine if the other electronic devices are capable of managing documents; and
if the other electronic devices are not capable of managing documents, denying access to the document.

3. The electronic security device of claim 1 further configured to:
determine if a user of the other electronic devices is authorized to access the document; and
if the user is authorized to access a document, grant access to the document.

4. The electronic security device of claim 1 wherein the document is stored remotely from the electronic security device.

5. The electronic security device of claim 1 further comprising a storage device and wherein the document is stored in the storage device.

6. The electronic security device of claim 1 wherein the one or more vicinity sensors includes an electromagnetic transmitter and receiver.

7. The electronic security device of claim 1 wherein the electronic security device comprises a tablet computing device.

8. A method, comprising:
by an electronic security device:
determining that one or more other devices are present in the vicinity of the electronic security device;
determining an identity of the one or more other devices in response to the determining that the other devices are present;
granting access to a document to a first device of the one or more other devices at least partly in response to the determining an identity of the one or more other devices, wherein the document is stored on a master device that is remote from the electronic security device, wherein the granting access to the document comprises providing authentication credentials to the first device, wherein the master device provides access to the document in response to receiving the authentication credentials from the first device;
determining that the first device leaves the vicinity of the electronic security device; and
denying access to the document to the first device in response to the determining that the first device leaves the vicinity.

9. The method of claim 8 further comprising:
determining that the first device is capable of managing documents, wherein the granting access to the document is further in response to the determining that the first device is capable of managing documents;
determining that a second device of the one or more other devices is not capable of managing documents; and
denying access to the document to the second device in response to the determining that the second device is not capable of managing documents.

10. The method of claim 8 further comprising:
determining that a user of the first device is authorized to access the document, wherein the granting access to the document is further in response to the determining that a user of the other electronic devices is authorized to access the document.

11. The method of claim 8, wherein the granting access to the document comprises informing the master device of the identity of the first device, wherein the master device provides access to the document in response to receiving the identity of the first device.

12. The method of claim 8, wherein the electronic security device comprises a tablet computing device.

13. The method of claim 8 further comprising:
opening the document to a collaborative environment, wherein the granting access to a document to the first device comprises allowing the first device to perform at least one of viewing the document in the collaborative environment and editing the document in the collaborative environment.

14. A non-transitory computer readable medium having stored thereon instructions executable by a processor of an electronic security device, the instructions configured to cause the processor to:
determine that one or more other devices are present in the vicinity of the electronic security device;
determine an identity of the one or more other devices in response to the determining that the other devices are present;
grant access to a document to a first device of the one or more other devices at least partly in response to the determining an identity of the one or more other devices, wherein the document is stored on a master device that is remote from the electronic security device, wherein the granting access to the document comprises providing authentication credentials to the first device, wherein the master device provides access to the document in response to receiving the authentication credentials from the first device;
determine that the first device leaves the vicinity of the electronic security device; and
deny access to the document to the first device in response to the determining that the first device leaves the vicinity.

15. The non-transitory computer readable medium of claim 14, the instructions further configured to cause the processor to:
determine that the first device is capable of managing documents, wherein the granting access to the document is further in response to the determining that the first device is capable of managing documents;
determine that a second device of the one or more other devices is not capable of managing documents; and
deny access to the document to the second device in response to the determining that the second device is not capable of managing documents.

* * * * *